United States Patent
Yoshida

(10) Patent No.: US 11,610,408 B2
(45) Date of Patent: Mar. 21, 2023

(54) BLIND SPOT INFORMATION ACQUISITION DEVICE, BLIND SPOT INFORMATION ACQUISITION METHOD, VEHICLE, AND NON-TRANSITORY STORAGE MEDIUM

(71) Applicant: TOYOTA JIDOSHA KABUSHIKI KAISHA, Toyota (JP)

(72) Inventor: Kaoru Yoshida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 177 days.

(21) Appl. No.: 17/132,263

(22) Filed: Dec. 23, 2020

(65) Prior Publication Data

US 2021/0248393 A1 Aug. 12, 2021

(30) Foreign Application Priority Data

Feb. 6, 2020 (JP) .............................. JP2020-018738

(51) Int. Cl.
*G06V 20/58* (2022.01)
*B60Q 9/00* (2006.01)
*G08B 7/06* (2006.01)
*G10L 25/78* (2013.01)
*G08B 21/02* (2006.01)

(52) U.S. Cl.
CPC ............... *G06V 20/58* (2022.01); *B60Q 9/00* (2013.01); *G08B 7/06* (2013.01); *G08B 21/02* (2013.01); *G10L 25/78* (2013.01)

(58) Field of Classification Search
CPC .......... G06V 20/58; B60Q 9/00; B60Q 9/008; B60Q 5/005; G08B 7/06; G08B 21/02; G10L 25/78; G10L 25/51; G08G 1/166; G08G 1/167; G01S 11/14; G01S 3/8083; B60W 40/02; B60W 50/14; B60W 2050/143; B60W 2050/146; B60W 2552/50

See application file for complete search history.

(56) References Cited

U.S. PATENT DOCUMENTS

2010/0214086 A1 8/2010 Yoshizawa et al.
2010/0228482 A1* 9/2010 Yonak ................. G01S 7/52001
 701/301

(Continued)

FOREIGN PATENT DOCUMENTS

DE 102004045690 A1 6/2005
DE 102017200961 A1 7/2018

(Continued)

OTHER PUBLICATIONS

Irie, Go et. al., "Cross-Media Scene Analysis: Estimating Objects' Visuals Only From Audio", NTT Technical Review, vol. 16, No. 11, (Nov. 2018), pp. 35-40.

*Primary Examiner* — Brian Wilson
(74) *Attorney, Agent, or Firm* — Oliff PLC

(57) ABSTRACT

A blind spot information acquisition device includes: a processor configured to: acquire sounds in an area around a vehicle, infer positions of occurrence of the sounds that have been acquired, acquire information relating to objects in the area around the vehicle, and determine that there is a sound occurring in a blind spot in a case in which a sound source in the positions of occurrence of the sounds cannot be identified from the information relating to objects in the area around the vehicle that has been acquired.

10 Claims, 7 Drawing Sheets

(56) References Cited

U.S. PATENT DOCUMENTS

| | | | |
|---|---|---|---|
| 2011/0175755 A1* | 7/2011 | Yoshioka | G08G 1/167 340/988 |
| 2015/0035685 A1* | 2/2015 | Strickland | B60Q 5/006 340/901 |
| 2018/0208113 A1 | 7/2018 | Haupts et al. | |
| 2019/0228305 A1 | 7/2019 | Lovison et al. | |

FOREIGN PATENT DOCUMENTS

| | | |
|---|---|---|
| DE | 102018200876 A1 | 7/2019 |
| DE | 102018221449 A1 | 6/2020 |
| JP | 2007-233864 A | 9/2007 |
| JP | 2008-257323 A | 10/2008 |
| JP | 4527204 B2 | 8/2010 |
| JP | 2010-204104 A | 9/2010 |
| WO | 2018/139650 A1 | 8/2018 |

\* cited by examiner

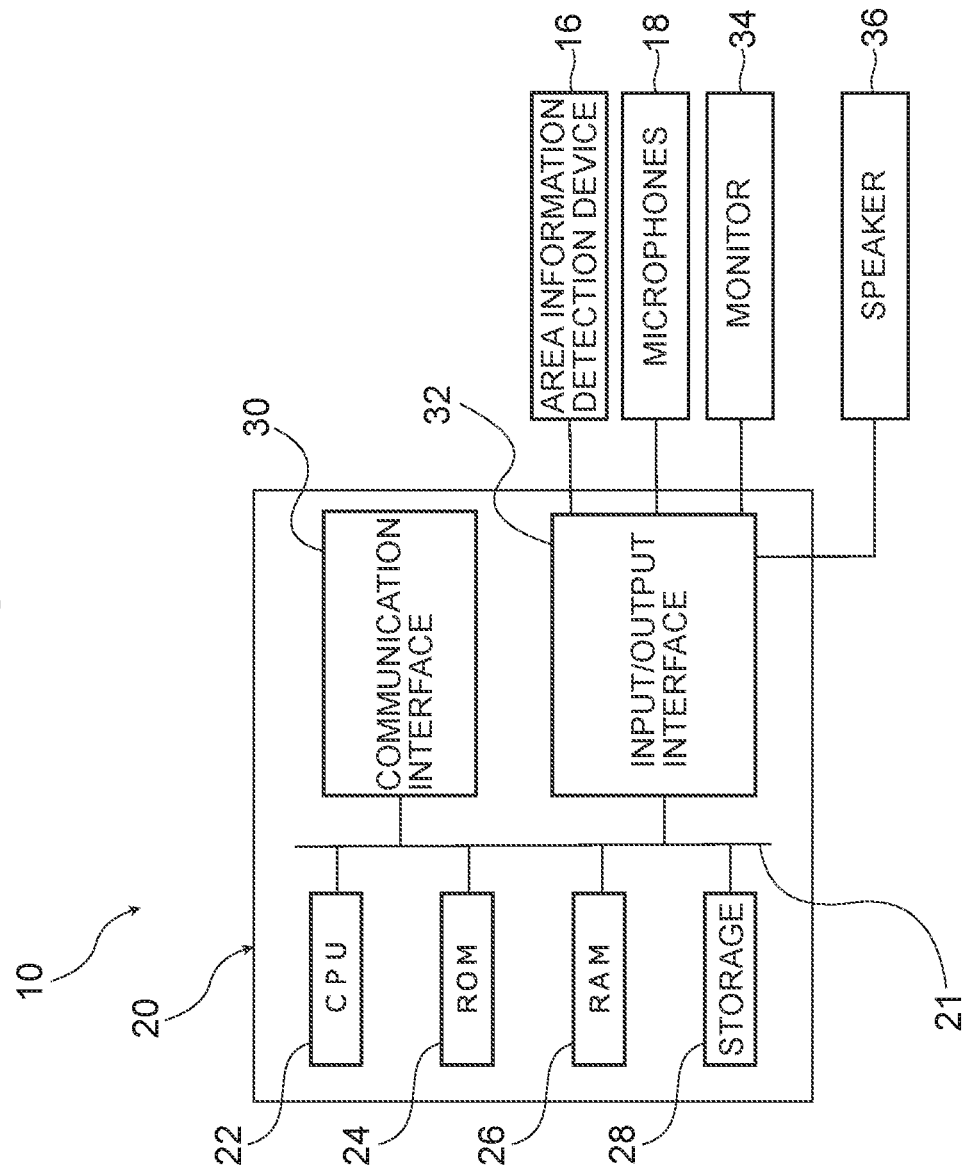

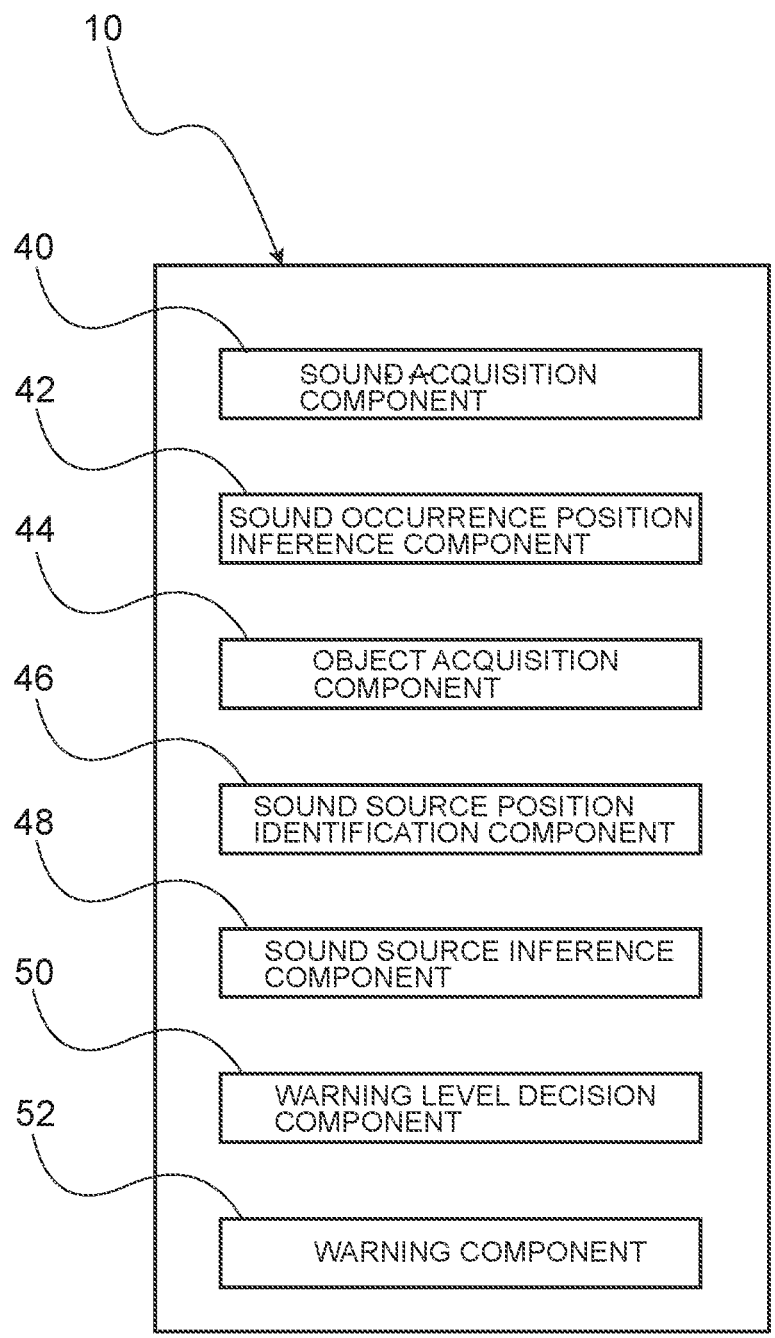

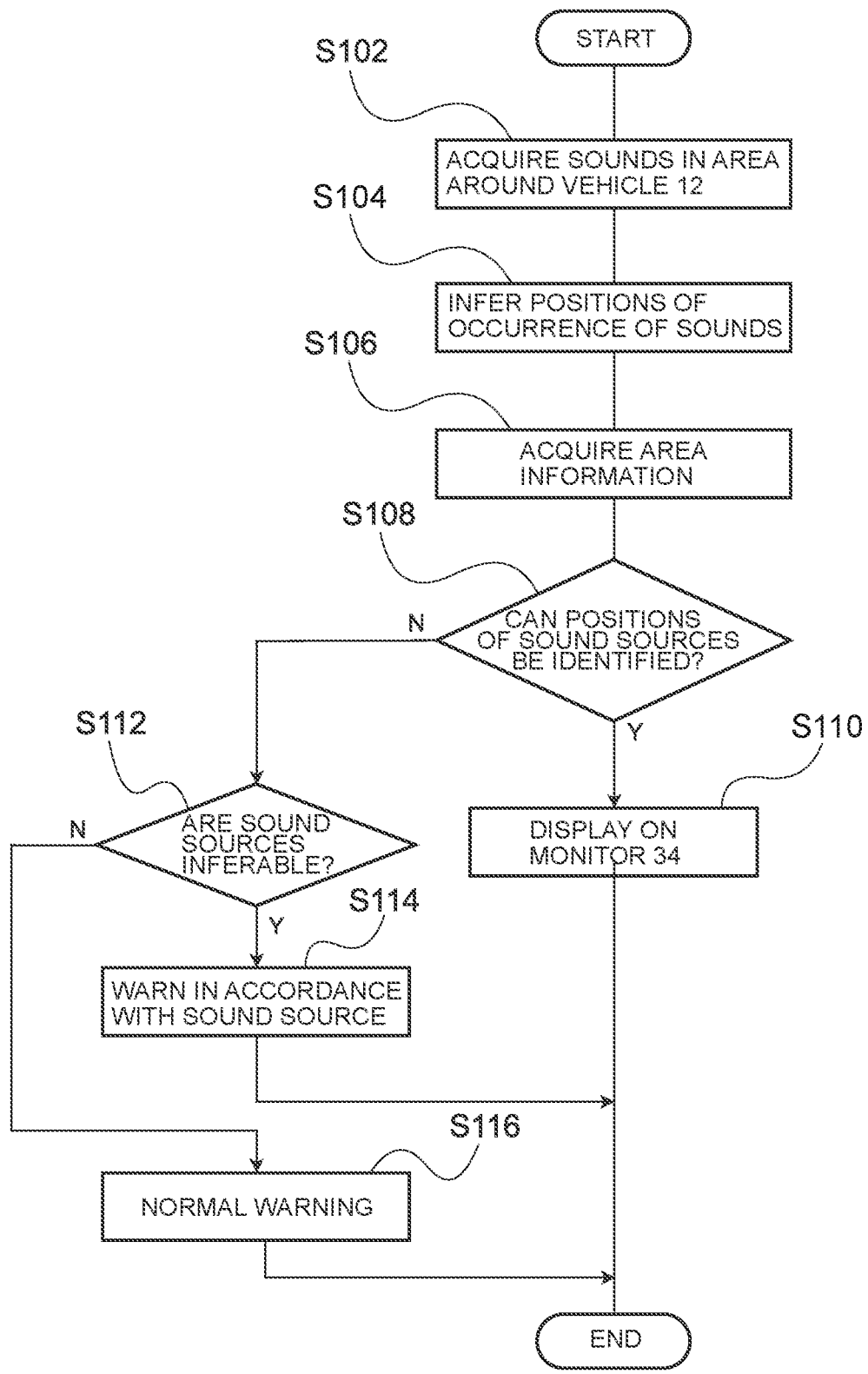

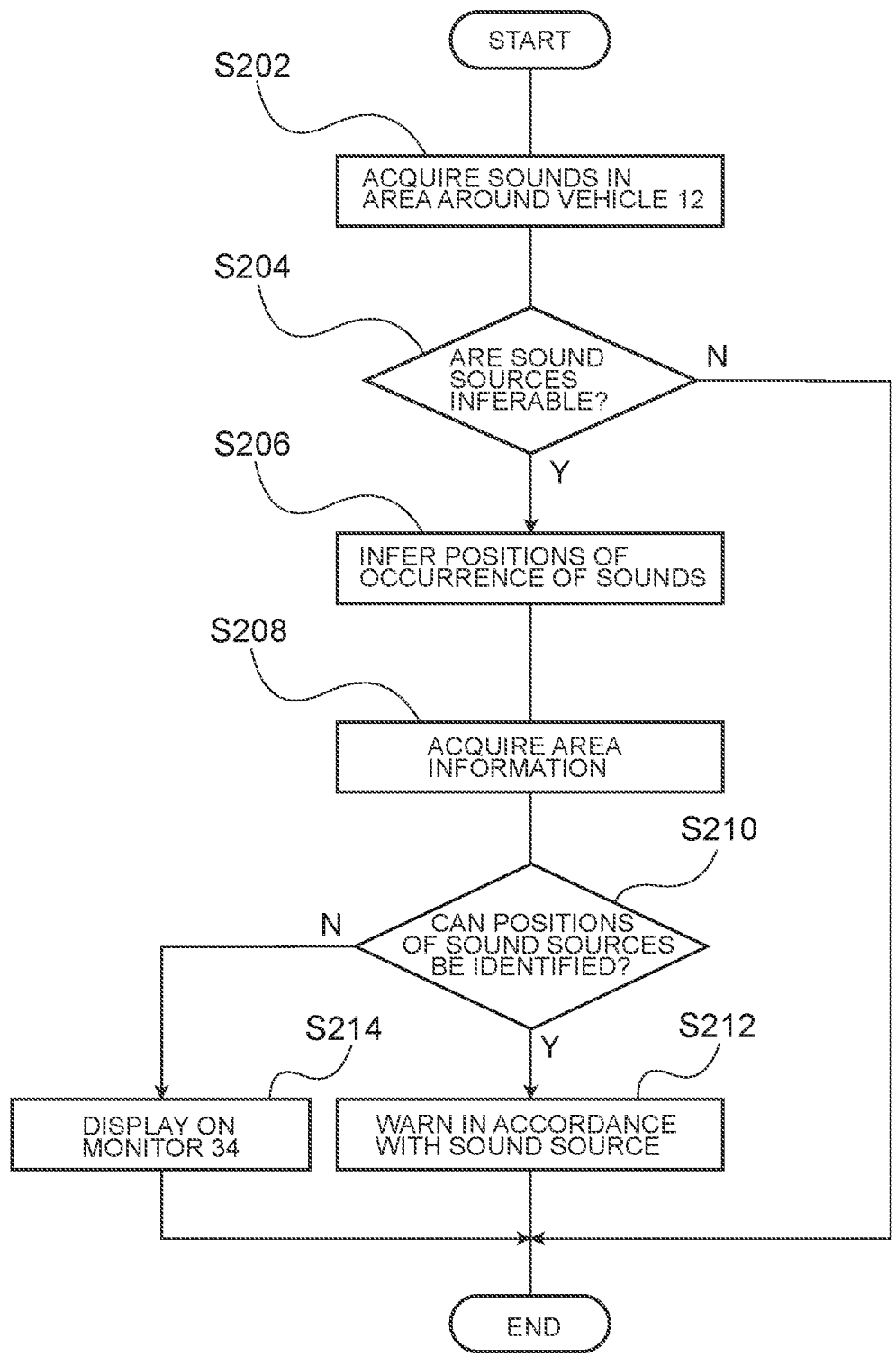

BLIND SPOT INFORMATION ACQUISITION DEVICE, BLIND SPOT INFORMATION ACQUISITION METHOD, VEHICLE, AND NON-TRANSITORY STORAGE MEDIUM

CROSS-REFERENCE TO RELATED APPLICATION

This application is based on and claims priority under 35 USC 119 from Japanese Patent Application No. 2020-018738 filed on Feb. 6, 2020, the disclosure of which is incorporated by reference herein.

BACKGROUND

Technical Field

This disclosure relates to a blind spot information acquisition device, a blind spot information acquisition method, a vehicle, and a program.

Related Art

Japanese Patent No. 4,527,204 discloses a blind spot vehicle detection device that detects vehicles in blind spots. The blind spot vehicle detection device disclosed in Japanese Patent No. 4,527,204 utilizes the principle that engine sounds and moving car sounds issuing from blind spots reach the host vehicle over the roofs of obstacles, and is configured to notify the occupant that there is a vehicle in a blind spot in a case in which the direction of a sound source is above.

However, the blind spot vehicle detection device disclosed in Japanese Patent No. 4,527,204 judges whether or not a sound is a sound from a blind spot on the basis of only the direction of the sound source, so there is room for improvement to accurately acquire blind spot information.

SUMMARY

The present disclosure provides a blind spot information acquisition device, a blind spot information acquisition method, a vehicle, and a program that may accurately acquire blind spot information.

A first aspect of the disclosure is a blind spot information acquisition device including: a sound acquisition component that acquires sounds in an area around a vehicle; a sound occurrence position inference component that infers positions of occurrence of the sounds that have been acquired by the sound acquisition component; an object acquisition component that acquires information relating to objects in the area around the vehicle; and a sound source position identification component that determines that there is a sound occurring in a blind spot in a case in which a sound source cannot be identified from the information that has been acquired by the object acquisition component based on the positions of occurrence of the sounds that have been inferred by the sound occurrence position inference component.

In the blind spot information acquisition device of the first aspect, sounds in the area around the vehicle are acquired by the sound acquisition component. Furthermore, the sound occurrence position inference component infers the positions of occurrence of the sounds that have been acquired by the sound acquisition component. Moreover, the object acquisition component acquires the information relating to objects in the area around the vehicle. Here, the sound source position inference component determines that there is a sound occurring in a blind spot that cannot be seen in a case in which a sound source cannot be identified from the information that has been acquired by the object acquisition component on the basis of the positions of occurrence of the sounds that have been inferred by the sound occurrence position inference component. In this way, the sound source position inference component identifies the sound source of a sound occurring in a blind spot based on the information that has been acquired by the object acquisition component in addition to the sound acquisition component, so blind spot information may be accurately obtained.

In a second aspect of the disclosure, in the first aspect, the sound acquisition component may acquire at least sounds of voices and sounds of footsteps of persons in the area around the vehicle.

In the blind spot information acquisition device of the second aspect, in a case in which, for example, the sound acquisition component has acquired sounds of voices and sounds of footsteps of persons in the area around the vehicle but a person who is a sound source could not be identified by the sound source position identification component, the sound source position identification component determines that there is a person in a blind spot.

A third aspect of the disclosure, in the first aspect or the second aspect, may further include: a warning component that issues a warning to an occupant of the vehicle, wherein the warning component issues a warning to the occupant in a case in which a sound occurring in a blind spot has been recognized by the sound source position identification component.

In the blind spot information acquisition device of the third aspect, the warning component issues a warning to the occupant in a case in which a sound occurring in a blind spot has been recognized by the sound source position identification component. Because of this, the occupant's attention may be directed to a person or a vehicle, for example, in a blind spot. It will be noted that the warning here is not limited to a warning using a voice or an alarm sound and includes the concept of calling the occupant's attention by displaying information on a monitor, for example.

A fourth aspect of the disclosure, in the third aspect, may further include: a sound source inference component that infers a type of the sound source producing the sound in the blind spot, wherein the warning component changes a content of the warning in accordance with the type of the sound source that has been inferred by the sound source inference component.

In the blind spot information acquisition device of the fourth aspect, the sound source inference component infers the type of the sound source producing the sound in the blind spot. For example, if a sound that has been acquired by the sound acquisition component is the sound of a person's voice, the sound source inference component infers that the type of the sound source is a person. Furthermore, if a sound that has been acquired by the sound acquisition component is an engine sound, the sound source inference component infers that the type of the sound source is a vehicle. The warning component changes the content of the warning in accordance with the type of the sound source, so the occupant may accurately grasp blind spot information.

In a fifth aspect of the disclosure, in the fourth aspect, the warning component may raise a level of the warning in a case in which it has been inferred by the sound source inference component that the sound source is a child as compared to a case in which it has been inferred that the sound source is an adult.

In the blind spot information acquisition device of the fifth aspect, the warning component raises the level of the warning to the occupant in a case in which it has been inferred by the sound source inference component that the sound source is a child as compared to a warning to the occupant in a case in which it has been inferred by the sound source inference component that the sound source is an adult. Typically children have greater difficulty recognizing danger than do adults, so by raising the level of the warning to the occupant in a case in which there is a child in a blind spot, the occupant may prepare against the eventuality of the child suddenly dashing out.

In a sixth aspect of the disclosure, in any one of the first to fifth aspects, the information relating to objects in the area around the vehicle that is acquired by the object acquisition component may be a captured image in which the area around the vehicle is captured.

In a seventh aspect of the disclosure, in the sixth aspect, the sound source position identification component may determine that there is a sound occurring in a blind spot in a case in which there is not a sound source in the position of occurrence of a sound in the captured image.

In the blind spot information acquisition device of the seventh aspect, the sound source position identification component verifies the existence of the sound sources on the basis of the captured image, so it may easily judge whether or not there is a sound occurring in a blind spot.

An eighth aspect of the disclosure is a vehicle including: the blind spot information acquisition device of any one of the first to seventh aspects; and a sound pickup device and an area information detection device that are provided at a vehicle body, wherein the sound acquisition component acquires, by means of the sound pickup device, sounds in the area around the vehicle, and wherein the object acquisition component acquires, by means of the area information detection device, information relating to objects in the area around the vehicle.

In the vehicle of the eighth aspect, the sound pickup device and the area information detection device are provided at the vehicle body. The sound acquisition component acquires, by means of the sound pickup device, sounds in the area around the vehicle. Furthermore, the object acquisition component acquires the information relating to objects based on data that have been detected by the area information detection device. It will be noted that the "area information detection device" here is a concept widely including devices equipped with sensors capable of detecting information relating to objects in the area around the vehicle, and includes optical cameras, radar systems, and lidar (laser imaging, detection, and ranging) systems, for example.

A ninth aspect of the disclosure is a blind spot information acquisition method including: a sound acquisition step of acquiring sounds in an area around a vehicle; a sound occurrence position inference step of inferring positions of occurrence of the sounds that have been acquired by the sound acquisition step; an object acquisition step of acquiring information relating to objects in the area around the vehicle; and a sound source position identification step of determining that there is a sound occurring in a blind spot in a case in which a sound source cannot be identified from the information that has been acquired by the object acquisition step based on the positions of occurrences of the sounds that have been inferred by the sound occurrence position inference step.

In the blind spot information acquisition method of the ninth aspect, sounds in the area around the vehicle are acquired by the sound acquisition step. Furthermore, the sound occurrence position inference step infers the positions of occurrence of the sounds that have been acquired by the sound acquisition step. Moreover, the object acquisition step acquires the information relating to objects in the area around the vehicle. Here, the sound source position identification step determines that there is a sound occurring in a blind spot in a case in which the sound source of a sound that has been inferred by the sound occurrence position inference step cannot be identified from the information that has been acquired by the object acquisition step. In this way, the sound source position identification step identifies the sound source of a sound occurring in a blind spot on the basis of the information that has been acquired by the object acquisition step in addition to the sound acquisition step, so blind spot information may be accurately obtained.

A tenth aspect of the disclosure is a program for causing a computer to execute a process including: a sound acquisition step of acquiring sounds in an area around a vehicle; a sound occurrence position inference step of inferring positions of occurrence of the sounds that have been acquired by the sound acquisition step; an object acquisition step of acquiring information relating to objects in the area around the vehicle; and a sound source position identification step of determining that there is a sound occurring in a blind spot in a case in which a sound source cannot be identified from the information that has been acquired by the object acquisition step based on the positions of occurrence of the sounds that have been inferred by the sound occurrence position inference step.

The program of the tenth aspect causes a computer to execute the following process. The sound acquisition step acquires sounds in the area around the vehicle. Furthermore, the sound occurrence position inference step infers the positions of occurrence of the sounds that have been acquired by the sound acquisition step. Moreover, the object acquisition step acquires information relating to objects in the area around the vehicle. Here, the sound source position identification step determines that there is a sound occurring in a blind spot in a case in which the sound source of a sound that has been inferred by the sound occurrence position inference step cannot be identified from the information that has been acquired by the object acquisition step. In this way, the sound source position identification step identifies the sound source of a sound occurring in a blind spot based on the information that has been acquired by the object acquisition step in addition to the sound acquisition step, so blind spot information may be accurately obtained.

According to the blind spot information acquisition device, the blind spot information acquisition method, the vehicle, and the program of the disclosure, blind spot information may be accurately obtained.

BRIEF DESCRIPTION OF THE DRAWINGS

An exemplary embodiment of the disclosure will be described in detail based on the following figures, wherein:

FIG. 4 is a block diagram illustrating hardware configurations of the blind spot information acquisition device pertaining to the exemplary embodiment;

FIG. 5 is a block diagram illustrating functional configurations of the blind spot information acquisition device pertaining to the exemplary embodiment;

FIG. 6 is a flowchart illustrating an example of the flow of a warning process in the exemplary embodiment; and FIG. 7 is a flowchart illustrating an example modification of the warning process in the blind spot information acquisition device pertaining to the exemplary embodiment.

DETAILED DESCRIPTION

Figure 1:
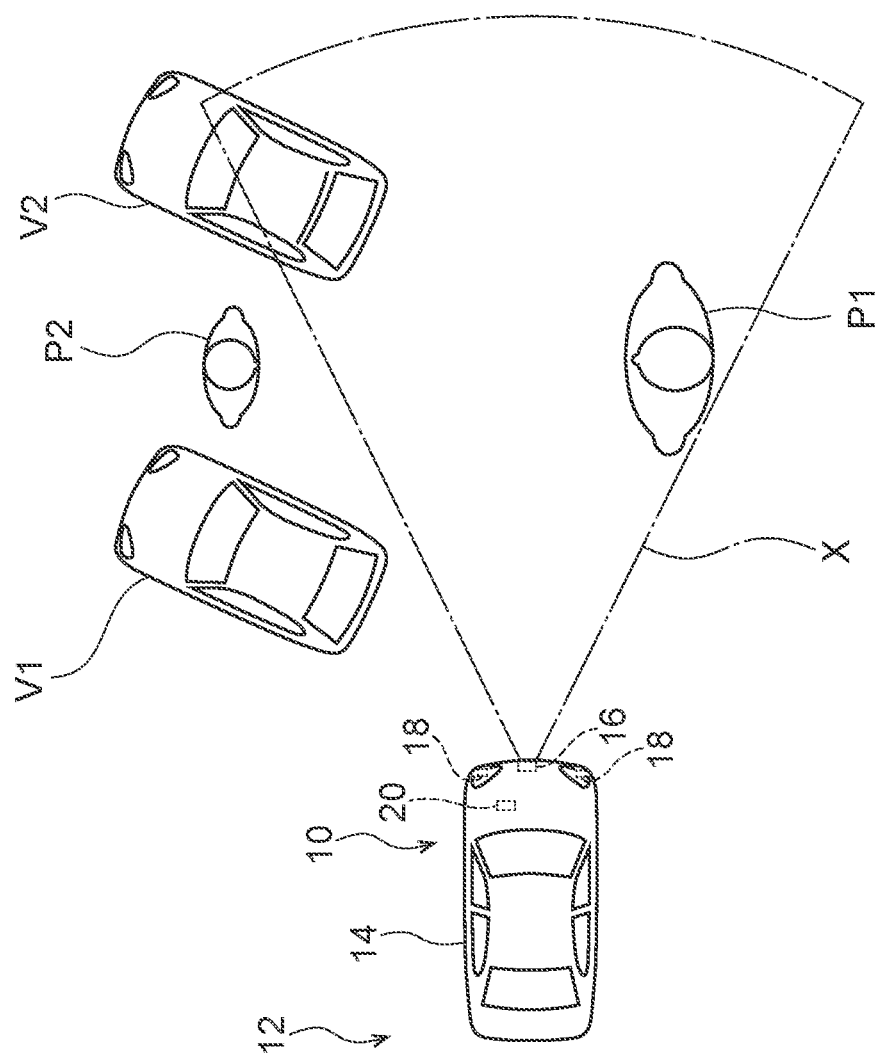
FIG. 1 is a schematic plan view illustrating a vehicle to which a blind spot information acquisition device pertaining to the exemplary embodiment has been applied and the area around the vehicle.

A vehicle 12 to which a blind spot information acquisition device 10 pertaining to an exemplary embodiment has been applied will be described with reference to the drawings. It will be noted that arrow UP and arrow RH appropriately illustrated in the drawings indicate the upward direction and the rightward direction, respectively, of the vehicle 12. Below, when description is given simply using the directions of front/rear, upper/lower, and right/left, unless otherwise specified these will be understood to mean front/rear in the vehicle front and rear direction, upper/lower in the vehicle up and down direction, and right/left when facing the vehicle forward direction. Furthermore, in some of the drawings, dimensional proportions are exaggerated depicted for convenience of description.

As illustrated in FIG. 1, the vehicle 12 of this exemplary embodiment is equipped with a vehicle body 14. Provided in the front end portion of the vehicle body 14 is an area information detection device 16. The area information detection device 16 is attached to a front bumper reinforcement (not illustrated in the drawings) that extends in the vehicle width direction through the front portion of the vehicle body 14. It will be noted that an optical camera, a radar system, and a lidar system, for example, can be used as the area information detection device 16. Furthermore, for example, the area information detection device 16 may also be configured by a combination of an optical camera and a lidar system. The area enclosed by long dashed short dashed line X in FIG. 1 is an example of the area detected by the area information detection device 16.

Also provided in the front end portion of the vehicle body 14 are a right and left pair of microphones 18 serving as sound pickup devices. The microphones 18 are provided on both vehicle width direction sides of the area information detection device 16 and are attached to the inner side of a fender panel (not illustrated in the drawings) or inside lamp covers for example. Furthermore, the microphones 18 are each pointed outward of the vehicle 12 and pick up sounds occurring in front of the vehicle 12.

Here, the vehicle 12 of this exemplary embodiment is equipped with the blind spot information acquisition device 10. The blind spot information acquisition device 10 is equipped with an electronic control unit (ECU) 20 that is a control unit. The blind spot information acquisition device 10 is configured to be able to acquire information about blind spots in the area around the vehicle 12 as a result of the area information detection device 16 and the microphones 18 being activated upon receiving an instruction from the ECU 20.

Figure 2:
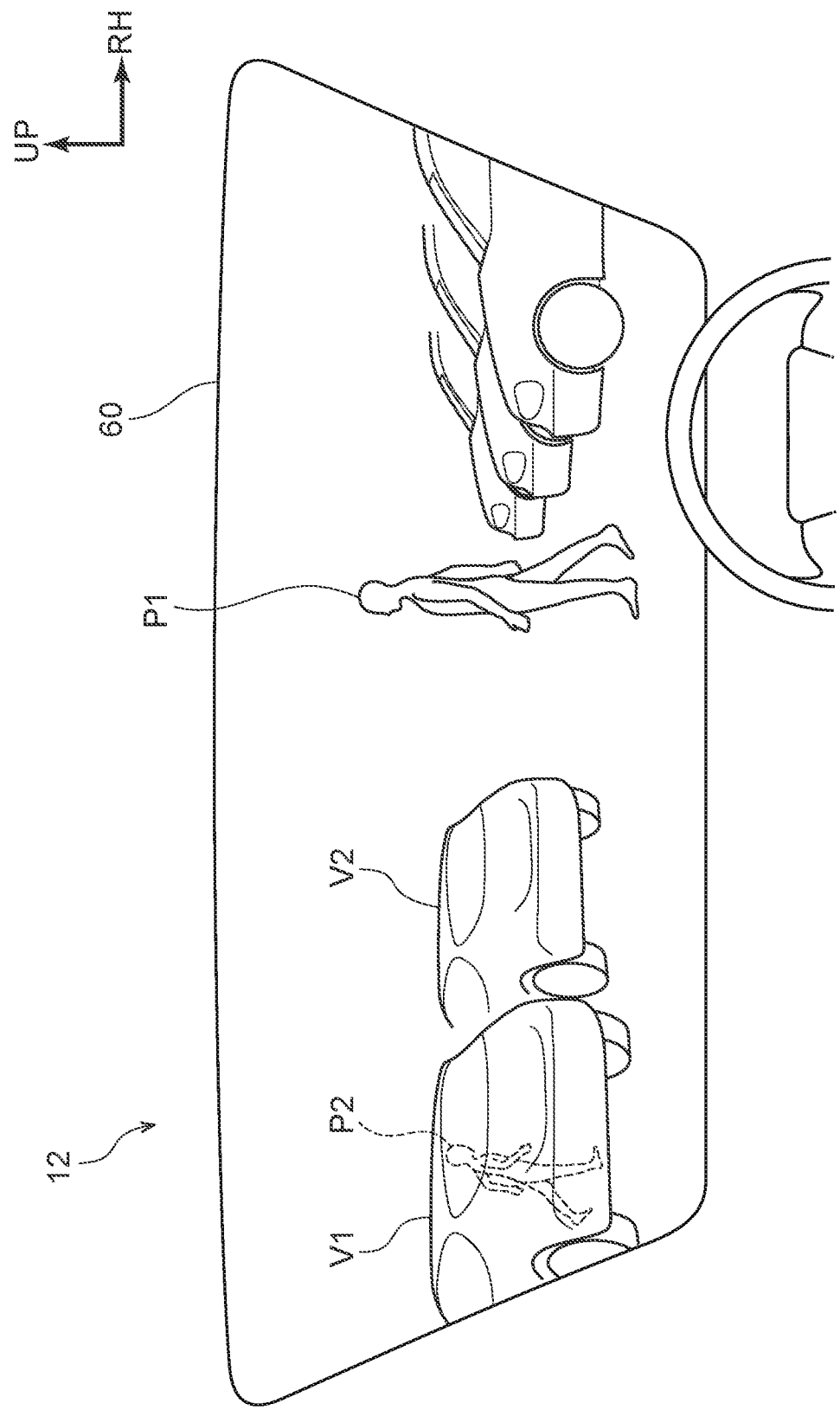
FIG. 2 is a drawing illustrating a scene seen from the vehicle pertaining to the exemplary embodiment.

FIG. 1 illustrates an adult pedestrian P1 standing in front and to the right of the vehicle 12 and a child pedestrian P2 standing in front and to the left of the vehicle 12. In this case, because the pedestrian P2 is standing between a stopped vehicle V1 and a stopped vehicle V2, as illustrated in FIG. 2 the position where the pedestrian P2 is standing is in a blind spot area that the driver of the vehicle 12 cannot see. The vehicle 12 to which the blind spot information acquisition device 10 pertaining to this exemplary embodiment has been applied can acquire information relating to the pedestrian P2 in this blind spot area.

(Hardware Configurations of Blind Spot Information Acquisition Device 10)

FIG. 4 is a block diagram illustrating hardware configurations of the blind spot information acquisition device 10. As illustrated in FIG. 4, the ECU 20 of the blind spot information acquisition device 10 is configured to include a central processing unit (CPU; processor) 22, a read-only memory (ROM) 24, a random-access memory (RAM) 26, a storage 28, a communication interface 30, and an input/output interface 32. These configurations are communicably connected to each other via a bus 21.

The CPU 22 executes various types of programs and controls each part. That is, the CPU 22 reads programs from the ROM 24 or the storage 28 and executes the programs using the RAM 26 as a work area. The CPU 22 controls each of the above configurations and performs various types of processing in accordance with the programs recorded in the ROM 24 or the storage 28.

The ROM 24 stores various types of programs and various types of data. The RAM 26 temporarily stores programs or data as a work area. The storage 28 is configured by a hard disk drive (HDD) or a solid-state drive (SSD), and is a non-transitory recording medium that stores various types of programs, including an operating system, and various types of data. In this exemplary embodiment, a program for performing a warning process and various types of data are stored in the ROM 24 or the storage 28.

The communication interface 30 is an interface for allowing the vehicle 12 to communicate with a server and other devices not illustrated in the drawings, and uses a standard such as Ethernet (registered trademark), LTE, FDDI, Wi-Fi (registered trademark), and Bluetooth (registered trademark), for example.

Connected to the input/output interface 32 are the area information detection device 16, the microphones 18, a monitor 34, and a speaker 36. The monitor 34 is provided in the cabin and configures a display that displays various types of information to the occupant. In this exemplary embodiment, as an example, the monitor 34 is provided in an instrument panel in the cabin. The speaker 36 is provided in the cabin and outputs sound.

(Functional Configurations of Blind Spot Information Acquisition Device 10)

The blind spot information acquisition device 10 uses the above hardware resources to realize various functions. The functional configurations that the blind spot information acquisition device 10 realizes will be described with reference to FIG. 5.

As illustrated in FIG. 5, the blind spot information acquisition device 10 is configured to include, as functional configurations, a sound acquisition component 40, a sound occurrence position inference component 42, an object acquisition component 44, a sound source position identification component 46, a sound source inference component 48, a warning level decision component 50, and a warning component 52. It will be noted that these functional configurations are realized as a result of the CPU 22 reading and executing the programs stored in the ROM 24 or the storage 28.

The sound acquisition component 40 acquires sounds in the area around the vehicle 12. In this exemplary embodiment, the sound acquisition component 40 acquires the sounds that have been picked up by the right and left pair of microphones 18. It will be noted that the sound acquisition component 40 may be configured to acquire only sounds in a preset frequency band out of the sounds that have been picked up by the microphones 18. For example, the sound acquisition component 40 may be configured to acquire only sounds in a frequency band produced by other vehicles, such as engine sounds and moving car sounds. Furthermore, the sound acquisition component 40 may be configured to acquire only sounds in a frequency band produced by persons, such as sounds of voices and sounds of footsteps.

Here, in this exemplary embodiment, the function of the sound acquisition component 40 will be described with reference to FIG. 2. FIG. 2 illustrates an example of a scene that the occupant of the vehicle 12 traveling at a low speed sees through a windshield glass 60. In this state, the sound acquisition component 40 acquires, from the microphones 18, sounds of footsteps of the pedestrian P1 and the pedestrian P2 and sounds of voices of the pedestrian P1 and the pedestrian P2 speaking.

Figure 3:
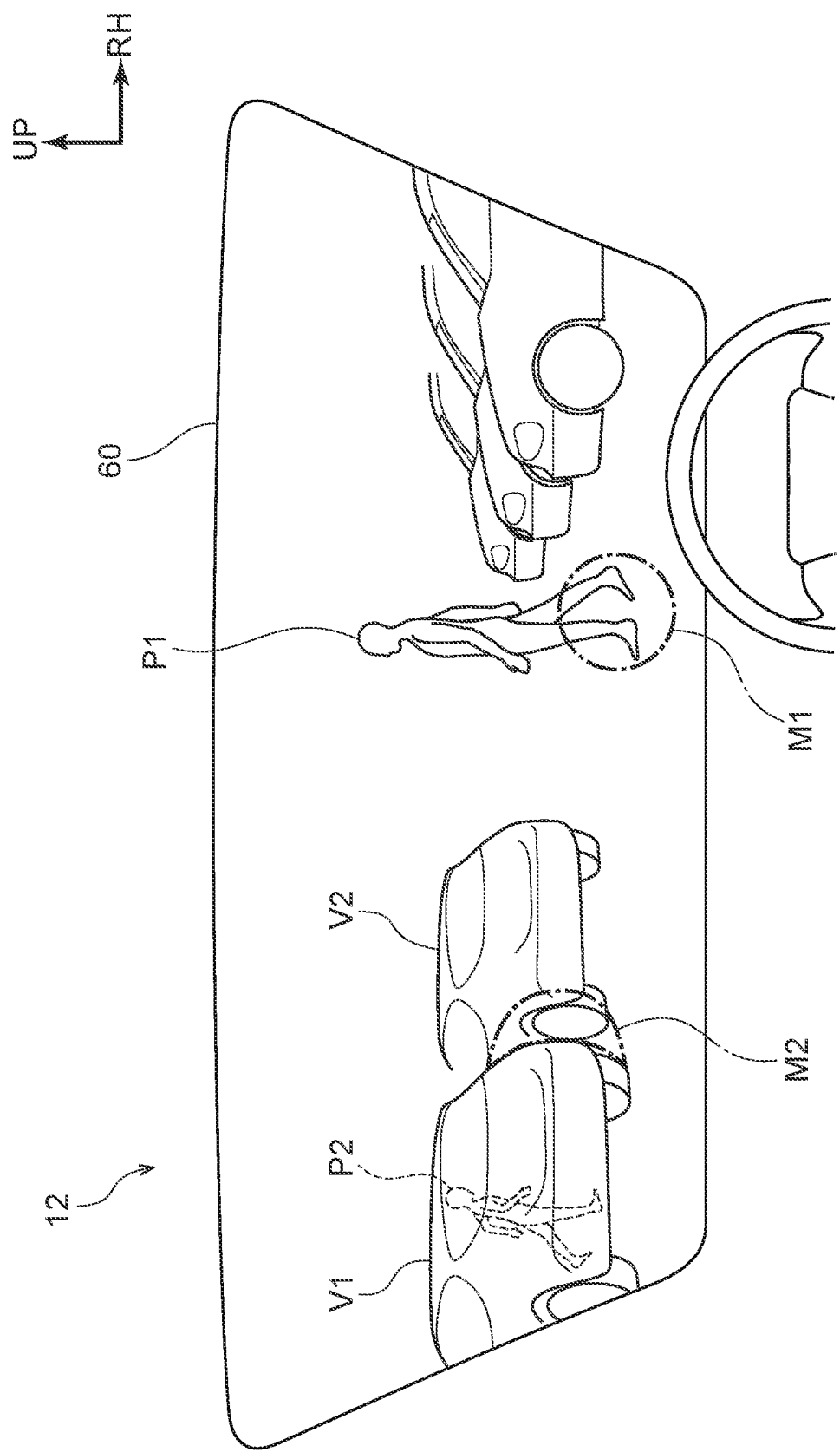
FIG. 3 is a drawing corresponding to FIG. 2 and illustrating information being detected by the blind spot information acquisition device pertaining to the exemplary embodiment.

As illustrated in FIG. 5, the sound occurrence position inference component 42 infers positions of occurrence of the sounds that have been acquired by the sound acquisition component 40. Specifically, the sound occurrence position inference component 42 infers, on the basis of a time difference in a case in which the microphones 18 have picked up the same sound, the direction in which the sound occurred relative to the vehicle 12 and the distance from the vehicle 12 to the position where the sound occurred. For example, in FIG. 2, the sound of the footsteps of the pedestrian P2 is picked up by the microphone 18 on the vehicle left side and then, after a given amount of time passes, is picked up by the microphone 18 on the vehicle right side. For this reason, the sound occurrence position inference component 42 infers that the position where the sound occurred is on the vehicle left side of the vehicle width direction center. Furthermore, because the sound is picked up by the microphones 18 of the vehicle 12 that is traveling, the sound occurrence position inference component 42 may infer the distance to the position where the sound occurred on the basis of the frequency of the sound that has been picked up and the change in its volume over time. In this way, as illustrated in FIG. 3, the sound occurrence position inference component 42 infers that the sound of the footsteps of the pedestrian P1 is in the position indicated by mark M1. Furthermore, the sound of the footsteps of the pedestrian P2 can be heard from between the stopped vehicle V1 and the stopped vehicle V2 as seen from the perspective of the vehicle 12, so the sound occurrence position inference component 42 infers that the position where the sound occurred is the position indicated by mark M2.

As illustrated in FIG. 5, the object acquisition component 44 acquires information relating to objects in the area around the vehicle 12. In this exemplary embodiment, the object acquisition component 44 acquires the information that has been detected by the area information detection device 16. For example, in a case in which the area information detection device 16 is configured by an optical camera, the object acquisition component 44 acquires, as the information relating to objects in the area around the vehicle 12, a captured image that has been captured by the optical camera. Furthermore, in a case in which the area information detection device 16 is configured by a radar system and a lidar system for example, the object acquisition component 44 acquires, as the information relating to objects in the area around the vehicle 12, information of reflected waves. Here, in FIG. 3, the stopped vehicle V1, the stopped vehicle V2, and the pedestrian P1 are acquired by the object acquisition component 44. However, objects in blind spots, such as the pedestrian P2, are not acquired by the object acquisition component 44.

As illustrated in FIG. 5, the sound source position identification component 46 identifies the positions of sound sources. Specifically, the sound source position identification component 46 identifies the positions of sound sources by checking the positions of occurrence of the sounds that have been inferred by the sound occurrence position inference component 42 against the information that has been acquired by the object acquisition component 44. In FIG. 3, the sound source position identification component 46 identifies the pedestrian P1 as the position of a sound source from the pedestrian P1 that has been acquired by the object acquisition component 44 and the position of occurrence of the sound of footsteps that has been inferred by the sound occurrence position inference component 42.

At the same time, the sound source position identification component 46 recognizes that there is a sound occurring in a blind spot in a case in which a sound source cannot be identified from the information that has been acquired by the object acquisition component 44 on the basis of the positions of occurrence of the sounds that have been inferred by the sound occurrence position inference component 42. For example, in a case in which the object acquisition component 44 has acquired a captured image, the sound source position identification component 46 recognizes that there is a sound occurring in a blind spot in a case in which there is not a sound source in the position of occurrence of a sound in the captured image. That is, in FIG. 3, the pedestrian P2 cannot be acquired by the object acquiring component 44, so the sound source of the sound of the footsteps of the pedestrian P2 cannot be identified by the sound source position identification component 46. Consequently, the sound source position identification component 46 recognizes that the sound of the footsteps of the pedestrian P2 is a sound occurring in a blind spot. In the same way, the sound source position identification component 46 recognizes that the sound of the voice of the pedestrian P2 is a sound occurring in a blind spot.

As illustrated in FIG. 5, the sound source inference component 48 infers the type of the sound source producing the sound in the blind spot. Specifically, data in which frequencies of sounds and types of sound sources are correlated with each other are stored beforehand in the storage 28, and the sound source inference component 48 infers, from the data, the sound source of the sound in the blind spot that has been acquired by the sound acquisition component 40. In this exemplary embodiment, in FIG. 3, the sound source inference component 48 infers that the sound source producing the sound in the blind spot is a person on the basis of the sound of the footsteps and the sound of the voice heard from the position of the mark M2. Furthermore, in this exemplary embodiment, as an example, in a case in which the sound source is a person, the sound source inference component 48 also infers whether the person is an adult or a child. The sound source inference component 48 makes these inferences on the basis of the frequencies of the sounds that have been picked up by the microphones 18, for example.

The warning level decision component 50 decides the level of the warning when warning the occupant in a case in which a sound occurring in a blind spot has been verified by the sound source position identification component 46.

Specifically, the warning level decision component 50 raises the level of the warning in a case in which it has been inferred by the sound source inference component 48 that the sound source in the blind spot is a child as compared to a case where it has been inferred that the sound source is an adult. Furthermore, for example, the warning level decision component 50 may also raise the level of the warning in a case in which it has been inferred by the sound occurrence position inference component 42 that the sound source in the blind spot is moving closer to the vehicle 12 as compared to a case where the sound source is moving away from the vehicle 12.

The warning component 52 issues a warning to the occupant in a case in which a sound occurring in a blind spot has been recognized by the sound source position identification component 46. Specifically, the warning component 52 warns the occupant by displaying on the monitor 34 content that calls the occupant's attention to the blind spot. Furthermore, in this exemplary embodiment, the warning component 52 warns the occupant by outputting an alarm sound from the speaker 36.

Here, the warning component 52 of this exemplary embodiment changes the content of the warning in accordance with the sound source that has been inferred by the sound source inference component 48. For example, in a case in which it has been inferred by the sound source inference component 48 that there is a person in a blind spot, the warning component 52 may warn the occupant by displaying on the monitor 34 a pictogram that resembles the shape of a person.

(Operation)

Next, the operation of the exemplary embodiment will be described.

(Warning Process)

An example of the warning process will be described using the flowchart illustrated in FIG. 6. The warning process is executed as a result of the CPU 22 reading a program from the ROM 24 or the storage 28, transferring it to the RAM 26, and executing it. It will be noted that in the following description, as an example, a case where the warning process is executed in the situation illustrated in FIG. 2 will be described.

As illustrated in FIG. 6, in step S102 the CPU 22 acquires the sounds in the area around the vehicle 12 (sound acquisition step). Specifically, the CPU 22 acquires, by means of the function of the sound acquisition component 40, the sounds that have been picked up by the microphones 18. Then, the CPU 22 moves to the process of step S104.

In step S104 the CPU 22 infers the positions of occurrence of the sounds. In this sound occurrence position inference step, the CPU 22 infers, by means of the function of the sound occurrence position inference component 42, the positions of occurrence of the sounds that have been acquired by the sound acquisition component 40. That is, the CPU 22 infers the directions of the positions of occurrence of the sounds relative to the vehicle 12 and the distances from the vehicle 12 to the positions of occurrence of the sounds. Then, the CPU 22 moves to the process of step S106.

In step S106 the CPU 22 acquires the information about the area around the vehicle 12. In this object acquisition step, the CPU 22 acquires, by means of the function of the object acquisition component 44, the information about objects in the area around the vehicle that has been detected by the area information detection device 16. Then, the CPU 22 moves to the process of step S108.

In step S108 the CPU 22 judges whether or not the positions of the sound sources can be identified. Specifically, the CPU 22 identifies, by means of the function of the sound source position inference component 46, the positions of the sound sources by checking the positions of occurrence of the sounds that have been inferred by the sound occurrence position inference component 42 against the information that has been acquired by the object acquisition component 44. In a case in which the positions of the sound sources can be identified, such as the pedestrian P1 illustrated in FIG. 3, the CPU 22 moves to the process of step S110. In a case in which the positions of the sound sources cannot be identified, such as the pedestrian P2, the CPU 22 moves to the process of step S112.

In step S110 the CPU 22 carries out a predetermined display on the monitor 34. For example, the CPU 22 indicates on the monitor 34 the fact that a person is standing in front of the vehicle 12. Furthermore, in a case in which the vehicle 12 is equipped with a driver assistance function, the CPU 22 may control the brakes to reduce the speed of the vehicle 12. Moreover, the CPU 22 may control the steering wheel and steer the vehicle 12 to avoid the pedestrian P1.

In a case in which the position of a sound source cannot be identified in step S108, the CPU 22 recognizes that there is a sound occurring in a blind spot. Step S108 is a sound source position inference step. Then, the CPU 22 moves to step S112 and judges whether or not the sound source is inferable. In a case in which the CPU 22 infers a sound source on the basis of the sounds that have been acquired by the sound acquisition component 40 and the sound source is inferable, the CPU 22 moves to the process of step S114. Furthermore, in a case in which the CPU 22 judges in step S112 that the sound source cannot be inferred, the CPU 22 moves to the process of step S116.

In step S114 the CPU 22 issues a warning in accordance with the sound source. The CPU 22 issues the warning by displaying an alert on the monitor 34 and outputting an alarm sound from the speaker 36. It will be noted that in a case in which the level of the warning is low, the CPU 22 may issue the warning with only a display on the monitor 34 and without outputting the alarm sound.

In a case in which the sound source cannot be inferred in step S112, the CPU 22 moves to step S116 and issues a normal warning For example, a warning method in a case in which the sound source cannot be identified is registered beforehand, and the CPU 22 issues a warning using this registered warning method. Then, the CPU 22 ends the warning process.

As described above, in the blind spot information acquisition device 10 pertaining to the exemplary embodiment, the sound occurrence position inference component 42 infers the positions of occurrence of the sounds that have been acquired by the sound acquisition component 40. Furthermore, the sound source position identification component 46 recognizes that there is a sound occurring in a blind spot in a case in which a sound source cannot be identified from the information that has been acquired by the object acquisition component 44 on the basis of the positions of occurrence of the sounds that have been inferred by the sound occurrence position inference component 42. In this way, the sound source position identification component 46 identifies the sound source of a sound occurring in a blind spot on the basis of the information that has been acquired by the object acquisition component 44 in addition to the sound acquisition component 40, so blind spot information can be accurately obtained.

Furthermore, the warning component 52 issues a warning to the occupant in a case in which a sound occurring in a blind spot has been recognized by the sound source position identification component 46. Because of this, the occupant's attention can be directed to a person or a vehicle, for example, in a blind spot.

Furthermore, in this exemplary embodiment, the sound acquisition component 40 acquires at least sounds of voices and sounds of footsteps of persons in the area around the vehicle. Because of this, in a case in which a person could not be identified from the information that has been acquired by the object acquisition component 44, the sound source position identification component 46 can recognize that there is a person in a blind spot.

Moreover, in this exemplary embodiment, the sound source inference component 48 infers the type of the sound source producing the sound in the blind spot, and the warning component 52 changes the content of the warning in accordance with the type of the sound source, so the occupant can accurately grasp blind spot information.

Moreover, in this exemplary embodiment, the warning component 52 raises the level of the warning to the occupant in a case in which it has been inferred by the sound source inference component 48 that the sound source is a child as compared to a warning to the occupant in a case in which it has been inferred by the sound source inference component 48 that the sound source is an adult. Because of this, the occupant can prepare against the eventuality of the child suddenly dashing out.

(Example Modification)

Next, an example modification of the warning process will be described using the flowchart of FIG. 7.

(Warning Process)

The warning process is executed as a result of the CPU 22 reading a program from the ROM 24 or the storage 28, transferring it to the RAM 26, and executing it (see FIG. 4). It will be noted that in the following description, as an example, a case where the warning process is executed in the situation illustrated in FIG. 2 will be described.

As illustrated in FIG. 7, in step S202 the CPU 22 acquires sounds in the area around the vehicle 12. Specifically, the CPU 22 acquires, by means of the function of the sound acquisition component 40, the sounds that have been picked up by the microphones 18. Then, the CPU 22 moves to the process of step S204.

In step S204 the CPU 22 judges whether or not the sound sources are inferable. That is, the CPU 22 infers, by means of the function of the sound source inference component 48, the sound sources on the basis of the sounds that have been acquired by the sound acquisition component 40. In this example modification, information about sound sources having the potential to obstruct driving are registered beforehand in the storage 28, and the CPU 22 infers the sound sources by comparing the registered sound source information and the sounds that have been acquired by the sound acquisition component 40. Then, in a case in which the sound sources are inferable, the CPU 22 moves to the process of step S206. Furthermore, in a case in which the CPU 22 judges in step S204 that the sound sources cannot be inferred, the CPU 22 ends the warning process.

In step S206 the CPU 22 infers the positions of occurrence of the sounds. Specifically, the CPU 22 infers, by means of the function of the sound occurrence position inference component 42, the positions of occurrence of the sounds that have been acquired by the sound acquisition component 40. Then, the CPU 22 moves to the process of step S208.

In step S208 the CPU 22 acquires the information about the area around the vehicle 12. Specifically, the CPU 22 acquires, by means of the function of the object acquisition component 44, the information about objects in the area around the vehicle that has been detected by the area information detection device 16. Then, the CPU 22 moves to the process of step S210.

In step S210 the CPU 22 judges whether or not the positions of the sound sources can be identified. Specifically, the CPU 22 identifies, by means of the function of the sound source position identification component 46, the positions of the sound sources by checking the positions of occurrence of the sounds that have been inferred by the sound occurrence position inference component 42 against the information that has been acquired by the object acquisition component 44. Then, in a case in which the positions of the sound sources can be identified, the CPU 22 moves to the process of step S212. In a case in which the positions of the sound sources cannot be identified, the CPU 22 moves to the process of step S214.

In step S212 the CPU 22 carries out a predetermined display on the monitor 34. For example, the CPU 22 indicates on the monitor 34 the fact that a person is standing in front of the vehicle 12. Furthermore, in a case in which the vehicle 12 is equipped with a driver assistance function, the CPU 22 may control the brakes to reduce the speed of the vehicle 12. Moreover, the CPU 22 may control the steering wheel and steer the vehicle 12 to avoid the pedestrian P1.

In a case in which the position of a sound source cannot be identified in step S210, the CPU 22 recognizes that there is a sound occurring in a blind spot. In this case, in step S214 the CPU 22 issues a warning in accordance with the sound source. The CPU 22 issues the warning by displaying an alert on the monitor 34 and outputting an alarm sound from the speaker 36. It will be noted that in a case in which the level of the warning is low, the CPU 22 may issue the warning with only a display on the monitor 34 and without outputting the alarm sound. Then, the CPU 22 ends the warning process.

As described above, in this example modification, the CPU 22 ends the warning process in a case in which it judges that the sound sources cannot be inferred, so the processes of step S206 on do not need to be performed in regard to sounds that pose no obstruction to driving. Because of this, the burden on the CPU 22 can be reduced.

The blind spot information acquisition device 10 pertaining to the exemplary embodiment has been described above, but it can of course be implemented in various ways without departing from the scope of the disclosure. For example, in the above exemplary embodiment, the blind spot information acquisition device 10 is configured to warn the occupant in a case in which it has recognized, by means of the function of the sound source position identification component 46, that there is a sound occurring in a blind spot, but the blind spot information acquisition device 10 is not limited to this. For example, the blind spot information acquisition device 10 may also display on the monitor 34 a mark indicating that there is a person in a blind spot. Furthermore, the blind spot information acquisition device 10 may also be configured to activate a driver assistance function to prepare against the eventuality of a person or another vehicle suddenly emerging from the blind spot. Specifically, the blind spot information acquisition device 10 may also be configured to activate a driver assistance function to decelerate the vehicle 12. Furthermore, the driver assistance function may limit steering of the steering wheel so as to keep the vehicle 12 from moving closer to the position where the sound is occurring.

Furthermore, in the above exemplary embodiment, the warning component 52 warns the occupant by displaying on the monitor 34 content that calls the occupant's attention to a blind spot, but the blind spot information acquisition device 10 is not limited to this. For example, the blind spot information acquisition device 10 may also be provided with a head-up display device that projects an image onto the windshield glass 60, so that a warning screen is projected onto the windshield glass by the head-up display device.

Moreover, in the above exemplary embodiment, as illustrated in FIG. 1, the right and left pair of microphones 18 are provided in the front end portion of the vehicle body 14, but the blind spot information acquisition device 10 is not limited to this. For example, a right and left pair of the same microphones may also be provided in the rear end portion of the vehicle body 14. In this case, sounds occurring in back of the vehicle body 14 can be picked up.

Moreover, in the above exemplary embodiment, various types of processors other than the CPU 22 may also execute the warning process that the CPU 22 executes by reading software (a program). Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the warning process may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in the above exemplary embodiment, various types of data are stored in the storage 28, but the blind spot information acquisition device 10 is not limited to this. For example, the various types of data may also be stored in a non-transitory recording medium such as a compact disc (CD), a digital versatile disc (DVD), and a universal serial bus (USB) memory.

What is claimed is:

1. A blind spot information acquisition device comprising:
   a processor configured to:
   acquire sounds in an area around a vehicle,
   infer positions of occurrence of the sounds that have been acquired,
   acquire information relating to objects in the area around the vehicle,
   determine that there is a sound occurring in a blind spot in a case in which a sound source in the positions of occurrence of the sounds cannot be identified from the information relating to objects in the area around the vehicle that has been acquired, and
   issue a warning to an occupant of the vehicle in a case in which the sound occurring in the blind spot has been recognized, wherein:
   positions of sound sources are identified by checking the positions of occurrence of the sounds that have been inferred against the information relating to objects in the area around the vehicle that has been acquired, and
   the warning is issued by both displaying an alert on a monitor and outputting an alarm sound when a level of a warning is high and the warning is issued with only displaying the alert on the monitor and without outputting the alarm sound when the level of the warning is low.

2. The blind spot information acquisition device of claim 1, wherein the processor acquires at least sounds of voices and sounds of footsteps of persons in the area around the vehicle.

3. The blind spot information acquisition device of claim 1, wherein the processor changes a content of the warning in accordance with a type of the sound source producing the sound in the blind spot.

4. The blind spot information acquisition device of claim 3, wherein the processor raises a level of the warning in a case in which it has been inferred that the sound source is a child as compared to a case in which it has been inferred that the sound source is an adult.

5. The blind spot information acquisition device of claim 1, wherein the information relating to objects in the area around the vehicle that is acquired by the processor is a captured image in which the area around the vehicle is captured.

6. The blind spot information acquisition device of claim 5, wherein the processor determines that there is a sound occurring in a blind spot in a case in which there is not a sound source in a position of occurrence of a sound in the captured image.

7. The blind spot information acquisition device of claim 1, wherein the processor infers, based on a time difference in a case in which plural sound pickup devices have picked up a same sound, a direction in which the sound occurred relative to the vehicle and a distance from the vehicle to a position where the sound occurred.

8. A vehicle comprising:
   the blind spot information acquisition device of claim 1; and
   a sound pickup device and an area information detection device that are provided at a vehicle body,
   wherein the blind spot information acquisition device acquires the sounds in the area around the vehicle and the information relating to objects in the area around the vehicle.

9. A blind spot information acquisition method comprising using a processor to:
   acquire sounds in an area around a vehicle,
   infer positions of occurrence of the sounds that have been acquired,
   acquire information relating to objects in the area around the vehicle,
   determine that there is a sound occurring in a blind spot in a case in which a sound source in the positions of occurrence of the sounds cannot be identified from the information that has been acquired, and
   issue a warning to an occupant of the vehicle in a case in which the sound occurring in the blind spot has been recognized, wherein:
   positions of sound sources are identified by checking the positions of occurrence of the sounds that have been inferred against the information relating to objects in the area around the vehicle that has been acquired, and
   the warning is issued by both displaying an alert on a monitor and outputting an alarm sound when a level of a warning is high and the warning is issued with only displaying the alert on the monitor and without outputting the alarm sound when the level of the warning is low.

10. A non-transitory storage medium in which is stored a program executable by a computer to execute a process, the process comprising:
- acquiring sounds in an area around a vehicle;
- inferring positions of occurrence of the sounds that have been acquired;
- acquiring information relating to objects in the area around the vehicle;
- determining that there is a sound occurring in a blind spot in a case in which a sound source cannot be identified in the positions of occurrence of the sounds from the information relating to objects in the area around the vehicle that has been acquired; and
- issuing a warning to an occupant of the vehicle in a case in which the sound occurring in the blind spot has been recognized, wherein:
    - positions of sound sources are identified by checking the positions of occurrence of the sounds that have been inferred against the information relating to objects in the area around the vehicle that has been acquired, and
    - the warning is issued by both displaying an alert on a monitor and outputting an alarm sound when a level of a warning is high and the warning is issued with only displaying the alert on the monitor and without outputting the alarm sound when the level of the warning is low.

* * * * *